Jan. 28, 1964    J. L. AASLAND    3,119,222
AGRICULTURAL APPARATUS
Filed Dec. 12, 1962    2 Sheets-Sheet 1

INVENTOR.
John L. Aasland
Atty.

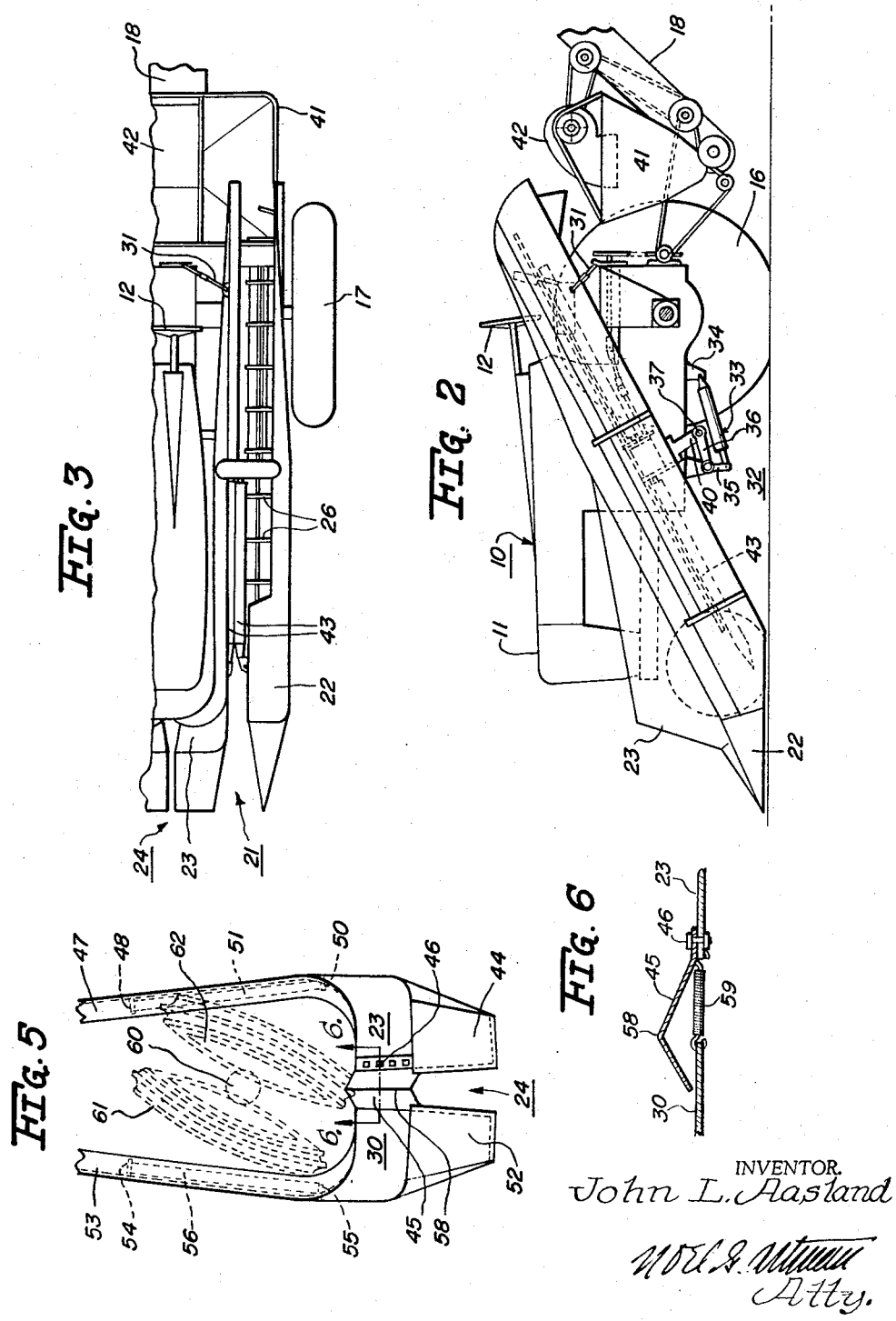

United States Patent Office 3,119,222
Patented Jan. 28, 1964

3,119,222
AGRICULTURAL APPARATUS
John L. Aasland, Pasadena, Calif., assignor to International Harvester Company, Chicago, Ill., a corporation of New Jersey
Filed Dec. 12, 1962, Ser. No. 244,079
7 Claims. (Cl. 56—119)

This invention is directed to an agricultural apparatus, and more specifically to a crop harvesting arrangement for mounting on a conventional tractor of the tricycle type.

Many crops are planted, cultivated, and subsequently harvested in a plurality of rows to facilitate the passage of either the draft animal or draft implement between the rows to pull the requisite planting, cultivating and harvesting equipment. When a tractor is utilized in harvesting ear corn, the corn picking apparatus normally includes a central shroud or protecting assembly for the main body portion of the tractor, extending from the tractor body downwardly and forwardly to prevent the entrance of corn stalks into the front steering wheel assembly of the tractor, and thus obviate the fouling of the steering wheel assembly.

It is desirable to maintain the lateral dimension of the center shroud at a minimum value, to define a large throat area between the central shroud arrangement and each of the outboard gathering points to facilitate the entry of the standing corn stalks into the gathering chains. In the past it has not proved possible to keep the lateral shroud dimension at the desired minimum value and still afford a sufficient area to accommodate the turning of the tractor's front steering wheel assembly. Accordingly, one approach to the solution of the problem is disclosed in Patent No. 2,473,978, issued June 21, 1949, to E. M. Van Buskirk. The solution there disclosed entailed the lifting of the center shroud divider to permit turning of the wheel assembly. Another step forward in the art is shown in Patent No. 3,035,390, which issued to E. K. Karlsson on May 22, 1962. In this solution the patentee cut out a portion of the center divider adjacent the steering wheel assembly, thus to afford the effectively increased lateral dimension of the steering wheel assembly as a wide turn is negotiated by the tractor. While this is a practical and feasible solution, nevertheless there is some possibility of the entry of stalks into the apertured center divider as the turn is negotiated, and it is therefore a primary object of the present invention to provide a center shroud of minimum lateral dimension and which nevertheless is completely closed on each side and at the front thereof.

It is a more specific object of the invention to provide such a tractor shroud which effectively changes dimensions during the turning operations to accommodate the position of the steering wheels as they are turned to an extreme angular position.

The foregoing and other objects of the invention are realized, in one embodiment, by providing a novel shroud assembly for use with a tractor which includes a body portion from which a tricycle-type steering wheel assembly depends. The shroud, although effectively presenting a closed front portion to the crop material, is actually comprised of first and second portions, each supported adjacent the tractor body and each having at least a part disposed adjacent the tricycle-type steering assembly. Means are provided for individually coupling a rear portion of each of the first and second shroud portions to the tractor body, to provide a reference pivot area around which the front part of each of said first and second portions may pivot in a direction away from each other in response to engagement by the extremities of the tires in the tricycle-type steering wheel assembly as the tractor steering wheel is turned through an arc exceeding a preassigned value. Thus, the tractor shroud presents a minimum lateral dimension when the tractor and associated apparatus is traveling straight ahead and is only extended to an increased lateral dimension when the tractor wheels are turned to an extreme angular position, a condition normally occurring only when the crop material is not being harvested but the tractor and associated apparatus is being turned at the end of a crop row to make the next harvesting or cultivating operation.

The best mode contemplated for carying out the invention will now be described. To enable those skilled in the art to make and use the invention, such description is set forth with the accompanying drawings, in the several figures of which like reference numerals identify like elements, and in which:

FIGURE 2 is a side view with certain elements depicted in broken lines, illustrating the embodiment of FIGURE 1;

FIGURE 3 is a partial top view of the structure illustrated in FIGURE 2;

FIGURE 5 is an illustrative showing, taken from the top and on a scale enlarged with respect to the previous figures, depicting the operation of the novel center shroud assembly as the steering wheels are rotated; and FIGURE 6 is a cross sectional view taken along lines 6—6 of FIGURE 5.

Figure 1:
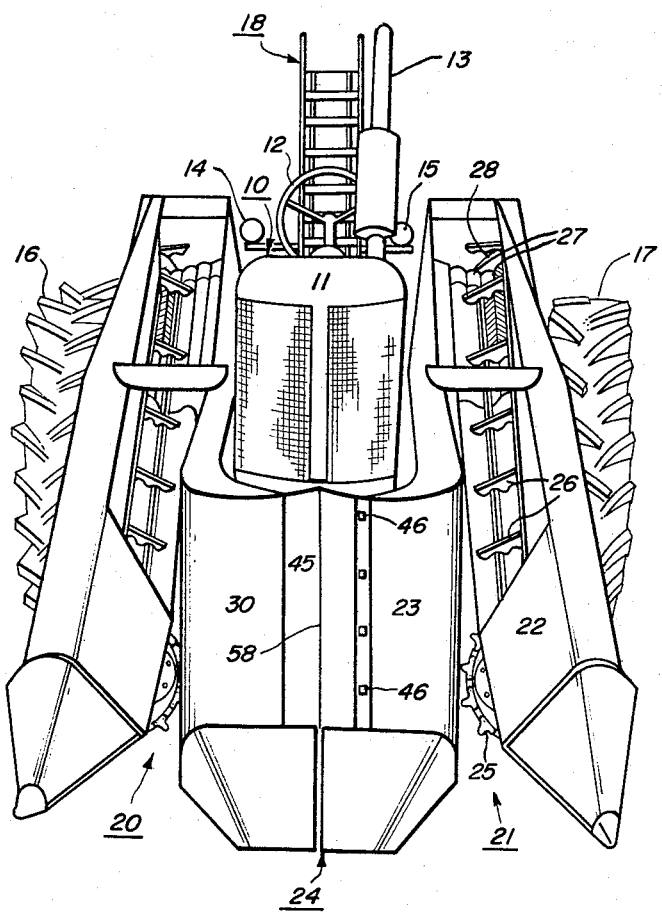
FIGURE 1 is a perspective illustration, looking rearwardly from the upper front portion of the tractor and picker, illustrating an embodiment of the invention.

As depicted in FIGURE 1, a conventional tractor is utilized to support and transport the corn picking equipment. Tractor 10 includes a body portion 11, a steering wheel 12, an exhaust pipe 13, a pair of lights 14 and 14, and a pair of rear drive tires 16 and 17. Behind the tractor a conventional elevator unit 18 is depicted, for transporting the corn ears upwardly and rearwardly by descent by gravity into a suitable trailing depository (not shown) such as a wagon.

There are two separate picking and husking assemblies, referenced by numerals 20 and 21 respectively, disposed at the right and left sides respectively of the tractor. "Right" and "left," as used herein, refer to the directions as referenced to an operator sitting in the normal operating position on the tractor. In like manner "front" and "rear" refer to the forward and rear portions of the tractor and associated apparatus as referenced to the operator's position.

In the left picking and husking unit 21, outer gathering point assembly 22 and a portion 23 of the center divider assembly 24 cooperate to define a throat area into which the corn stalks of each row are received. A gathering chain 25 in the assembly 22 cooperates with another gathering chain, not visible in FIGURE 1 because it is behind portion 23, to feed the stalks into the snapping rolls (also not visible because it is located behind cented divider portion 23). The snapped ears are passed upwardly and rearwardly by a plurality of fingers 26 on a forwarding chain to husking rolls 27. The husked ears slide downwardly on a ramp 28 for receipt in a suitable trough prior to elevation over unit 18. Similar units are combined in the right side snapping and picking unit 20 and both the construction and operation of such structures are well known and understood in this art.

In accordance with the inventive teaching, a shroud portion 30 cooperates with the left front shroud portion 23 to comprise the main constituents of the center shroud assembly 24. Thus the two divider portions 23 and 30 cooperate to provide what is, in effect, a unitary front divider assembly. The illusion of greater lateral dimension is present in FIGURE 1 because the center shroud is nearest the observer, but as will be appreciated from the subsequent explanation in connection with the other figures of the drawing, the center shroud assembly provides a maximum protection with a unitary closure arrangement while still affording free movement of the tricycle-type steering wheel arrangement when the tractor and picking units are turned.

Figure 4:
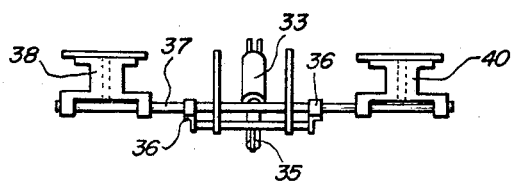
FIGURE 4 is a front view, taken on a scale enlarged with respect to that of FIGURES 2 and 3, illustrating a portion of the mounting and interconnecting arrangement between the tractor and the corn picker.

FIGURE 2 illustrates the left side picking and husking arrangement and its support adjacent the tractor body. A turnbuckle 31 provides intercoupling between the upper, rearmost portion of the picker-snapper arrangement 21 and a rear portion of the tractor body. A lift arrangement 32 is positioned centrally and beneath the tractor body to effect the support and upward and downward displacement of the picking units in a well-known manner. The assembly includes a double-acting cylinder 33 of which the barrel is coupled at one end to a bracket 34 affixed to the tractor body and at the other end the cylinder rod is pivotally secured to one arm 35 of a type of bellcrank lever, supported by the tractor frame. The other arm 36 of the bellcrank lever, as illustrated, has two sections each designated 36. These arms 36 carry a cross shaft 37 which in turn slidably mounts a pair of supports 38 and 40 (see also FIGURE 4). The supports 38 and 40 are free both to pivot about shaft 37 to accommodate the different angles of inclination of the husking and picking units as they are raised and lowered, and further to accommodate inward and outward shifting of these units by affording a transverse sliding motion of each of supports 38 and 40 along the shaft 37. From the foregoing it is apparent that actuation of cylinder 33 raises and lowers the position of shaft 37 and thereby raises and lowers the entire harvesting unit with respect to the tractor. The range of movement of the supports 38 and 40 need not be great, inasmuch the the turnbuckle 31 provides an anchor or reference location at the rear of the picking unit, with an intermediate range of movement of the unit along shaft 37, and maximum displacement or pivoting action being accomplished adjacent the tricycle-type steering wheels during the turning operation. The fit between shaft 37 and supports 38 and 40 is by necessity a loose fit to permit a slight canting.

In FIGURES 2 and 3, a hopper 41 for receiving the corn ears, a fan 42 for effecting air displacement to remove the dust and light trash from the hopper and from the ears, and a portion of elevator 18 are also shown. Snapping rolls 43 are also shown in FIGURES 2 and 3. Inasmuch as these units, as well as the various drive arrangements for receiving energy from the power take-off shaft of the tractor and for distributing such energy to the tractor-mounted units and to the associated apparatus at the rear of the tractor are now well known and understood in this art; these units are not depicted in detail.

As shown in FIGURE 5, shroud segment 23 includes a front shield portion and a panel 45 secured to it as by bolts 46. The panel 45 is creased along line 58 for the purpose of adding rigidity to said panel. As clearly illustrated in FIGURE 6 panel 45 is secured to shroud segment 23 and overlies shroud segment 30 but is not secured to the latter. The panel overlaps shroud segment 30 for a sufficient distance that when the front wheels 61 and 62 have spread segments 23 and 30 to their maximum angle the gap between said segments is covered by the panel. As best seen in FIGURE 6 shroud segments 23 and 30 are spring biased 59 toward each other.

The main longitudinal portion 47 of segment 23 supports, on the inner surface thereof, a pair of bearings or journal supports 48 and 50, in which roller 51 is journaled. On the other side of the center shroud assembly, segment 30 supports a front shield portion 52, and the main longitudinal portion of this segment is referenced by numeral 53. A pair of journal supports 54 and 55 are affixed to the inner portion of wall 53, and another roller 56 is journaled in supports 54 and 55. Thus the panels 45 and 57 cooperate to provide a normally closed front portion of the center shroud, thereby to prevent the entry of any crop material into the steering wheel assembly. The steering assembly is pivoted about a reference axis, identified by numeral 60, and the tricycle-type steering wheel assembly includes a pair of wheels 61 and 62, depicted in broken lines.

Under normal conditions the tractor and associated crop-processing equipment proceeds down the rows of crop material, with the main segments of the center shroud assembly being positioned in abutting relation as depicted in FIGURE 1. In this way the lateral dimension of the center shroud unit is kept at a minimum and the center shroud arrangement cooperates with the outer gatherer points to raise the maximum amount of down corn and provide for an efficient snapping operation. In accordance with a feature of the invention, when the operator of the tractor makes a sharp turn and effects a displacement of the tricycle-type steering wheel assembly beyond a preassigned angle, the peripheries of the wheels engage the rollers 51 and 56 as illustrated in FIGURE 5, causing the shroud segments to be displaced laterally away from each other and accommodate the effectively increased lateral dimension of this steering wheel assembly. Thus the equipment can still be turned in a minimum radius, and as the steering wheel assembly including wheels 61 and 62 is returned to an angle less than the preassigned value at which the rollers are engaged, the center shroud assembly is likewise returned by springs 59 to the configuration depicted in FIGURE 1. In this way the minimum lateral shroud dimension is obtained without the need for shroud lifts, cutouts or other unusual shroud configurations in the vicinity of the steering wheel assembly, thus obviating fouling of the steering gear by the entry of corn stalks or the like.

What is claimed is:

1. For use with a tractor having a body portion from which a tricycle-type steering wheel assembly depends, an agricultural apparatus comprising a central shroud assembly for protecting said tricycle-type steering wheel assembly against entanglement with crop material, said shroud assembly comprising first and second portions each supported adjacent said tractor body and having at least a part thereof disposed adjacent one side of the tricycle-type steering wheel assembly, and means for respectively coupling a rear part of each of said first and second portions to said tractor body to afford displacement of the front part of each of said first and second portions away from each other responsive to engagement thereby of the steering wheel assembly as said assembly is turned through an arc exceeding a preassigned value.

2. For use with a tractor having a tricycle-type steering wheel arrangement, a central shroud assembly comprising first and second longitudinal segments, means for coupling a rear portion of each longitudinal segment to the tractor body to afford displacement of the front portions of the longitudinal segments responsive to engagement by the tractor steering wheel, and friction-reducing means individually affixed to the inner front portion of each of said first and second longitudinal segments, thereby to minimize the friction developed during engagement of each of said front portions by the tricycle-type tractor steering wheel arrangement.

3. In an agricultural apparatus for support by a tractor having a tricycle-type steering wheel assembly, a central shroud assembly supported adjacent the tractor body, said shroud assembly comprising at least a first and a second substantially longitudinal segment, each longitudinal segment having a front portion adapted to wrap around the front central portion of the tractor body, a panel secured to the front portion of one of said segments and overlapping said other segment such that the gap between said segments will be closed when said segments are spread apart.

4. For use in gathering ears of corn from rows of standing stalks in cooperation with a tractor including a front body portion from which a tricycle-type steering wheel assembly is supported, a corn picker apparatus including a central shroud assembly having left and right sections each disposed substantially parallel to the longitudinal axis of the tractor body, each section having a lower area normally positioned adjacent said tricycle-type steering wheel assembly, rotation of said steering wheel assembly through an arc exceeding a preassigned value being effective to cause engagement of the steering wheel assembly with said lower areas of the shroud sections, forcing the shroud sections apart until the steering wheel assembly is subsequently returned to a steering angle less than said preassigned value.

5. For use with a tractor having a tricycle-type steering wheel arrangement, a corn picking apparatus including a center shroud assembly, said assembly including first and second symmetrically disposed L-shaped segments, the extremities of said segments being adjacent each other in front of the tractor body to prevent entry and entanglement of corn talks adjacent the steering gear, means for coupling a rear portion of each of said segments to a rear portion of said tractor in a restraining manner, each of said sections having a front wheel-engaging portion disposed for engagement by said tricycle-type steering wheel arrangement as said wheel arrangement is displaced through an angular displacement greater than a predetermined value.

6. A corn picking apparatus as set forth in claim 5 in which each of said wheel-engaging portions comprises a roller journaled on supports affixed to the inner portion of the shroud segment, whereby a displacing movement is transferred from the wheel arrangement to the shroud segments with a minimum of friction.

7. A corn picking apparatus as set forth in claim 5 in which a panel is secured to one of said segments along the edge of its extremity and extends outwardly therefrom to overlap the other segment a substantial distance.

No references cited.